(12) United States Patent
Song et al.

(10) Patent No.: US 12,386,580 B2
(45) Date of Patent: Aug. 12, 2025

(54) CLOUD SERVER SUPPORTING CO-EDITING BETWEEN ELECTRONIC DEVICES AND OPERATING METHOD THEREOF

(71) Applicant: Samsung Electronics Co., Ltd., Gyeonggi-do (KR)

(72) Inventors: Sungyoon Song, Gyeonggi-do (KR); Gun Park, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 91 days.

(21) Appl. No.: 18/108,927

(22) Filed: Feb. 13, 2023

(65) Prior Publication Data

US 2023/0195404 A1 Jun. 22, 2023

Related U.S. Application Data

(63) Continuation of application No. PCT/KR2022/015709, filed on Oct. 17, 2022.

(30) Foreign Application Priority Data

Dec. 6, 2021 (KR) .......................... 10-2021-0172778
Dec. 28, 2021 (KR) .......................... 10-2021-0189965

(51) Int. Cl.
*G06F 3/14* (2006.01)
*G06F 3/041* (2006.01)

(52) U.S. Cl.
CPC ............ *G06F 3/1462* (2013.01); *G06F 3/041* (2013.01)

(58) Field of Classification Search
None
See application file for complete search history.

(56) References Cited

U.S. PATENT DOCUMENTS

| 9,098,230 | B2 | 8/2015 | Masuda et al. |
| 9,513,765 | B2 * | 12/2016 | Miyazaki ............ G06F 3/03547 |
| 10,657,219 | B2 | 5/2020 | Bowman et al. |
| 11,004,272 | B2 * | 5/2021 | Wei ........................... G06T 7/70 |

(Continued)

FOREIGN PATENT DOCUMENTS

| JP | 2012-247861 A | 12/2012 |
| JP | 6431336 B2 | 11/2018 |

(Continued)

*Primary Examiner* — Toan H Vu
(74) *Attorney, Agent, or Firm* — Cha & Reiter, LLC.

(57) ABSTRACT

A server, one or more electronic devices and method thereof are disclosed. The server provides cloud-based services and includes a communication module, a memory and a processor. The electronic devices further include a display. Both are operable to implement the method, including the server receiving input data including coordinate information from the device(s), the server determining whether the coordinates include a set of adjacent coordinates disposed within a threshold distance of each other, the server generating setting information if so, and transmitting the setting information and coordination information to the devices. The devices display a screen based on data received from the server, generate coordinate information based on user inputs, transmit input data including the coordinate information to the server, and display an object.

14 Claims, 12 Drawing Sheets

(56) References Cited

U.S. PATENT DOCUMENTS

| | | | |
|---|---|---|---|
| 2002/0046887 A1* | 4/2002 | Yanagisawa | G06F 3/0317 |
| | | | 345/156 |
| 2012/0249415 A1* | 10/2012 | Nakajima | G06F 3/04883 |
| | | | 345/1.3 |
| 2014/0340352 A1* | 11/2014 | Nakajima | G06F 3/04166 |
| | | | 345/174 |
| 2018/0064024 A1* | 3/2018 | Choi | G05D 1/0227 |
| 2020/0042128 A1* | 2/2020 | Yang | G06F 3/04886 |
| 2021/0349625 A1* | 11/2021 | Li | G06T 11/60 |
| 2021/0349628 A1* | 11/2021 | Lin | G06F 3/03547 |
| 2022/0011888 A1* | 1/2022 | Kim | G06F 3/0338 |
| 2023/0139193 A1* | 5/2023 | Lin | G01S 5/12 |
| | | | 342/442 |

FOREIGN PATENT DOCUMENTS

| | | |
|---|---|---|
| KR | 10-2017-0070555 A | 6/2017 |
| KR | 10-1826625 B1 | 2/2018 |
| KR | 10-1876134 B1 | 7/2018 |
| KR | 10-2019-0039767 A | 4/2019 |
| KR | 10-2019-0138798 A | 12/2019 |

\* cited by examiner

CLOUD SERVER SUPPORTING CO-EDITING BETWEEN ELECTRONIC DEVICES AND OPERATING METHOD THEREOF

CROSS-REFERENCE TO RELATED APPLICATIONS

This application is a Bypass continuation application of International Application No. PCT/KR2022/015709 designating the United States, filed on Oct. 17, 2022, in the Korean Intellectual Property Receiving Office and claiming the benefit under 35 USC § 119(a) of Korean Patent Application No. 10-2021-0172778 filed on Dec. 6, 2021, and Korean Patent Application No. 10-2021-0189965 filed on Dec. 28, 2021, in the Korean Intellectual Property Office, the entire disclosures of which are incorporated herein by reference for all purposes.

BACKGROUND

1. Technical Field

The disclosure relates to cloud computing, and more particularly, to time-shifting user inputs in a collaborative, cloud-based multi-user workspace.

2. Description of Related Art

Recently, electronic devices have advanced so as to provide a diversity or applications and functions, in addition to the ability to communicate with external electronic devices over networks. As electronic devices continue to advance, a demand has arisen for cloud computing capabilities. Cloud computing enables users to store information in a remote server on the Internet, and to access the server for the stored information for usage anytime and anywhere. The increase in cloud computing demand has accelerated the development of various applications that leverage cloud computing in their operations. The development of electronic devices with cloud computing functionality thus enables users to access servers and other such services, such that a same set of applications of information can be accessed over multiple electronic devices.

SUMMARY

A cloud server may enable a plurality of users to perform together co-editing such as drawing or handwriting through electronic devices, thereby enabling cloud-based multi-user collaborative workspaces. As all of the users may perform editing in the multi-user workspace, the electronic devices will generally display results of the edits according to the order in which the user inputs are transmitted to the cloud server, which then provides rendering instructions to each of the electronic devices.

However, when the users perform editing at positions near to each other, readability of objects in the workspace may be degraded due to overlapping coordinates, line segments, drawings, and the like.

According to an embodiment, a server is disclosed, providing cloud-based services for one or more electronic devices, including: a communication module configured to communicate with the one or more electronic devices; a memory storing computer-executable instructions; and a processor operatively coupled to the communication module and the memory, wherein the instructions are executable by the processor to cause the server to: receive input data including at least coordinate information, from at least one of the one or more electronic devices; determine whether adjacent coordinates are included in the coordinate information within a threshold distance of one another by analyzing the coordinate information; based on detecting the adjacent coordinates, generate setting information corresponding to the coordinate information; and transmit output data including the coordinate information and the setting information to the one or more electronic devices.

According to an embodiment, an electronic device is disclosed, including: a communication module configured to communicate with a server providing could-based services for one or more electronic devices including the electronic device; a memory storing computer-executable instructions; and a processor operatively coupled to the communication module, the display module and the memory, wherein the instructions are executable by the processor to cause the electronic device to: display, on the display module, a screen based on output data received from the server, wherein the output data includes coordinate information that is input to at least one of the one or more electronic devices, and setting information corresponding to the coordination information; generate coordinate information based on a user input; transmit, to the server, input data including at least the coordinate information; and display an object corresponding to the coordinate information based on the setting information.

According to an embodiment, an operating method is disclosed, of a server providing cloud-based services for one or more electronic devices, including: receiving input data including at least coordinate information from at least one of the one or more electronic devices, determining whether adjacent coordinates are included in the coordinate information within a threshold distance by analyzing the coordinate information, based on detecting the adjacent coordinates, generating setting information corresponding to the coordinate information, and transmitting output data including the coordinate information and the setting information to the one or more electronic devices.

According to certain embodiments of the present disclosure, there is provided an electronic device that may transmit together time information corresponding to coordinate information to a cloud server and may display an object corresponding to the coordinate information based on setting information generated in the cloud server.

According to certain embodiments of the present disclosure, there is provided a cloud server that may receive coordinate information and time information corresponding to the coordinate information from an electronic device and may generate setting information through correction of an output speed or through time-shifting when there are adjacent coordinates.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
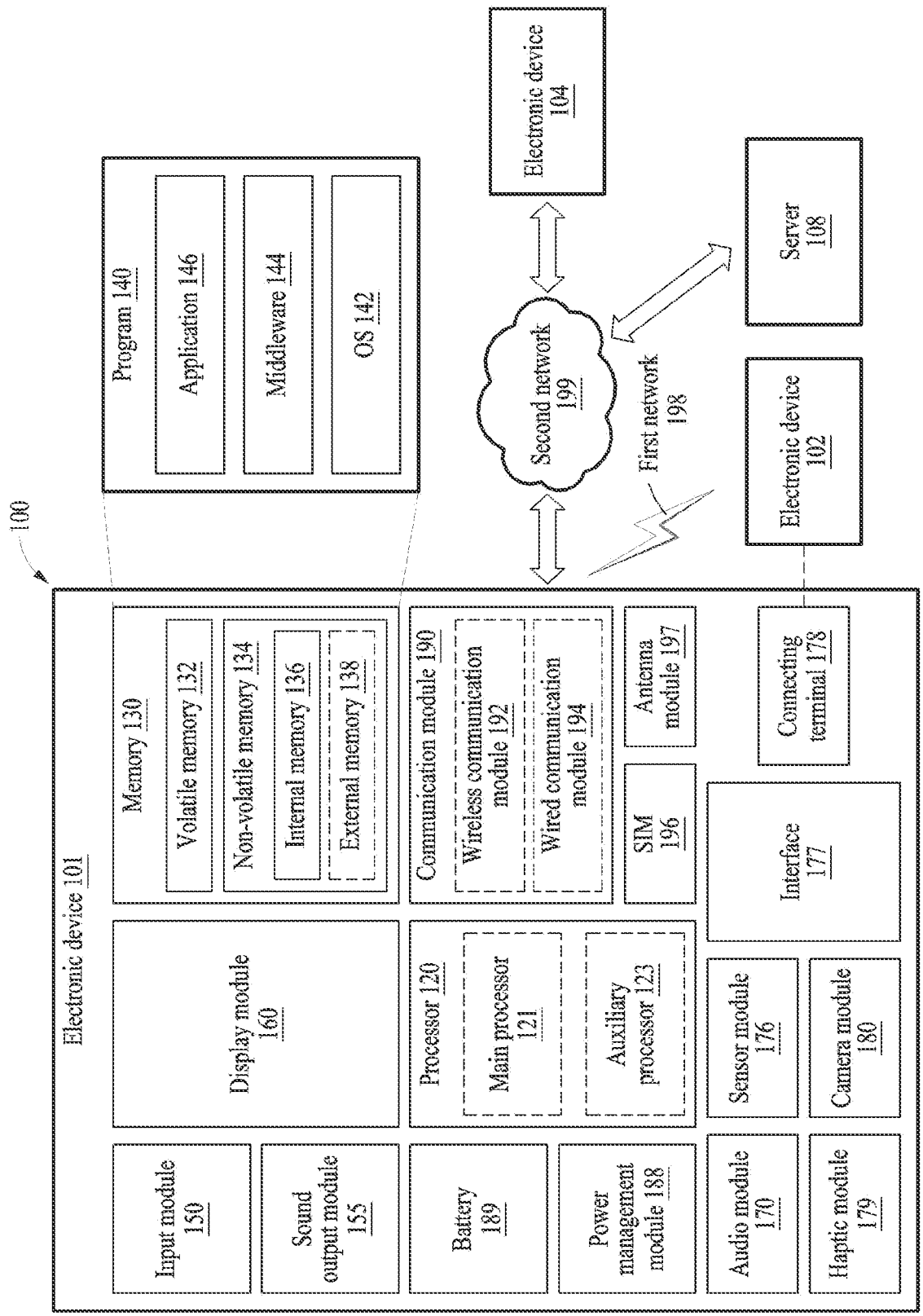
FIG. 1 is a block diagram illustrating an electronic device in a network environment according to an embodiment.

Hereinafter, certain example embodiments will be described in greater detail with reference to the accompanying drawings. When describing the example embodiments with reference to the accompanying drawings, like reference numerals refer to like elements and a repeated description related thereto will be omitted.

<Electronic Device and Cloud Server>

FIG. 1 is a block diagram illustrating an example electronic device in a network environment according to an embodiment.

FIG. 1 is a block diagram illustrating an electronic device 101 in a network environment 100 according to an embodiment. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specifically for artificial intelligence (AI) model processing. An AI model may be generated by machine learning. The learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control its corresponding one of the display, the hologram device, and the projector. The display module 160 may include a touch sensor adapted to sense a touch, or a pressure sensor adapted to measure an intensity of a force of the touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). The connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, and flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

The antenna module 197 may form a mmWave antenna module. The mmWave antenna module may include a PCB, an RFIC on a first surface (e.g., a bottom surface) of the PCB or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. All or some of operations to be executed by the electronic device 101 may be executed by one or more of the external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or service, may request one or more external electronic devices to perform at least a part of the function or service. The one or more external electronic devices receiving the request may perform the at least part of the function or the service requested, or an additional function or an additional service related to the request and may transfer a result of the performance to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra-low latency services using, e.g., distributed computing or MEC. In an embodiment, the external electronic device (e.g., the electronic device 104) may include an Internet-of-things (IoT) device. The server 108 may be an intelligent server using machine learning and/or a neural network. The external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
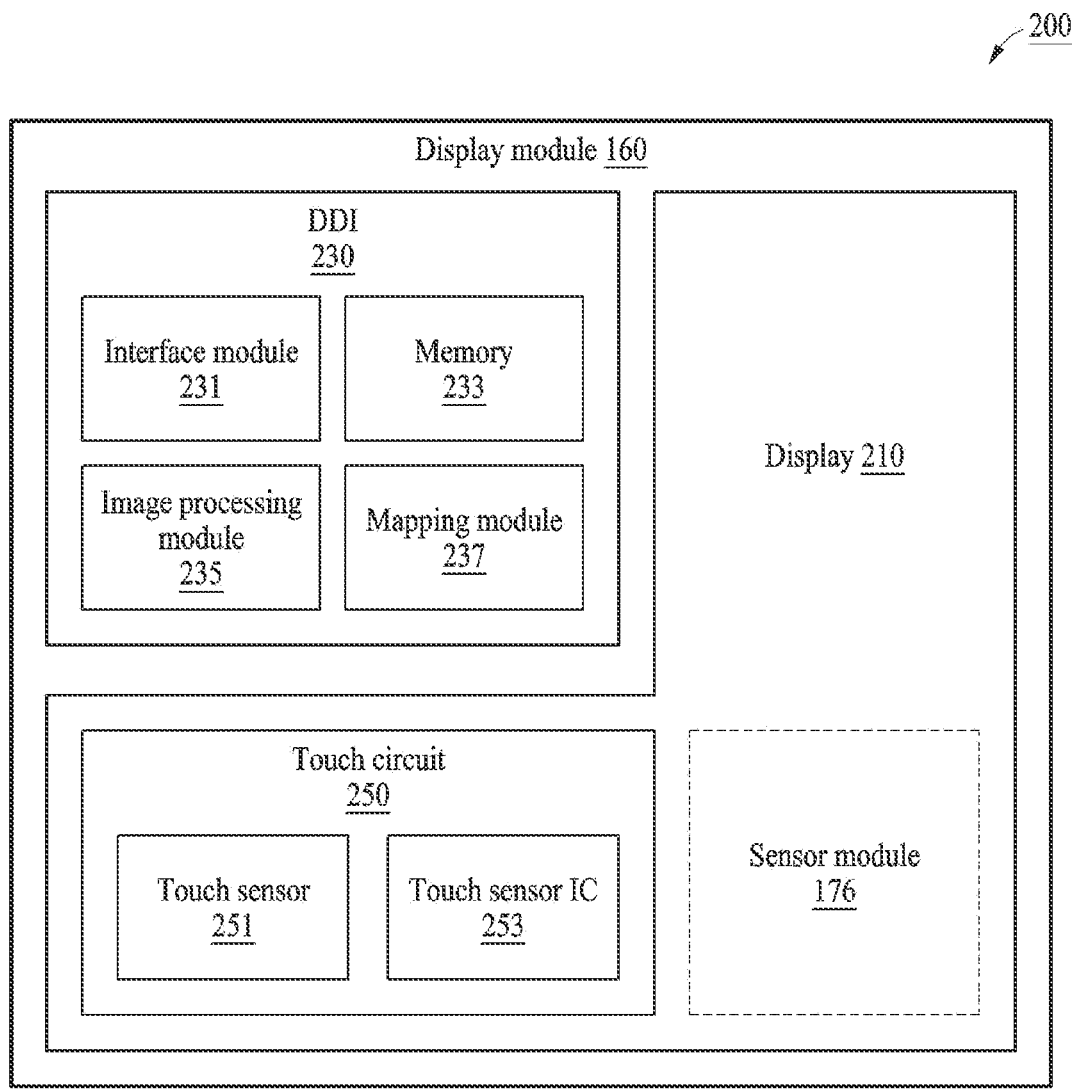
FIG. 2 is a block diagram illustrating a display module according to an embodiment.

FIG. 2 is a block diagram 200 illustrating the display module 160 according to an example embodiment. Referring to FIG. 2, the display module 160 may include a display 210 and a display driver integrated circuit (IC) (DDI) 230 for controlling the display 210. The DDI 230 may include an interface module 231, a memory 233 (e.g., a buffer memory), an image processing module 235, or a mapping module 237. The DDI 230 may receive, for example, image data or image information including an image control signal corresponding to a command for controlling the image data from another component of the electronic device 101 through the interface module 231. For example, the image information may be received from the processor 120 (e.g., the main processor 121 (e.g., an application processor)) or the auxiliary processor 123 (e.g., a graphics processing unit (GPU)) operating independently of a function of the main processor 121. The DDI 230 may communicate with a touch circuit 250 or the sensor module 176 through the interface module 231. In addition, the DDI 230 may store, in the memory 233, at least a portion of the received image information in units of frames, for example. The image processing module 235 may perform pre-processing or post-processing (e.g., adjusting resolution, brightness, or size) on the portion of the image data based at least on a characteristic of the image data or a characteristic of the display 210. The mapping module 237 may generate a voltage value or a current value corresponding to the image data obtained through the pre-processing or the post-processing by the image processing module 235. The generation of the voltage value or the current value may be performed based at least on attributes (e.g., an arrangement of pixels (RGB stripe or pentile structure), or size of each sub-pixel) of pixels of the display 210. As at least some pixels of the display 210 may operate based at least on the voltage value or the current value, visual information (e.g., text, images, or icons) corresponding to the image data may be displayed on the display 210.

According to an embodiment, the display module 160 may further include the touch circuit 250. The touch circuit 250 may include a touch sensor 251 and a touch sensor integrated circuit (IC) 253 for controlling the touch sensor 251. For example, the touch sensor IC 253 may control the touch sensor 251 to sense a touch input or a hovering input made at a specific position on the display 210. In this example, the touch sensor IC 253 may sense the touch input or the hovering input by measuring a change (e.g., a voltage, a light amount, a resistance, or an electric charge amount) in a signal for the specific position on the display 210. The touch sensor IC 253 may provide the processor 120 with information (e.g., a position, an area, a pressure, or a time) associated with the sensed touch input or hovering input. At least a portion (e.g., the touch sensor IC 253) of the touch circuit 250 may be included as a portion of the DDI 230, the display 210, or another component (e.g., the auxiliary processor 123) provided outside the display module 160.

According to an embodiment, the display module 160 may further include at least one sensor (e.g., a fingerprint sensor, an iris sensor, a pressure sensor, or an illuminance sensor) of the sensor module 176, or a control circuit for controlling the sensor. In this case, the sensor or the control circuit may be embedded in a portion (e.g., the display 210 or the DDI 230) of the display module 160 or a portion of the touch circuit 250. For example, when the sensor module 176 embedded in the display module 160 includes a biosensor (e.g., a fingerprint sensor), the biosensor may obtain biometric information (e.g., a fingerprint image) associated with a touch input to a partial area of the display 210. For another example, when the sensor module 176 embedded in the display module 160 includes a pressure sensor, the pressure sensor may obtain pressure information associated with a touch input through a partial area or an entire area of the display 210. The touch sensor 251 or the sensor module 176 may be arranged between pixels of a pixel layer of the display 210, or above or below the pixel layer.

According to certain embodiments of the present disclosure, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It is to be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

Certain embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to certain embodiments, a method described herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration.

According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
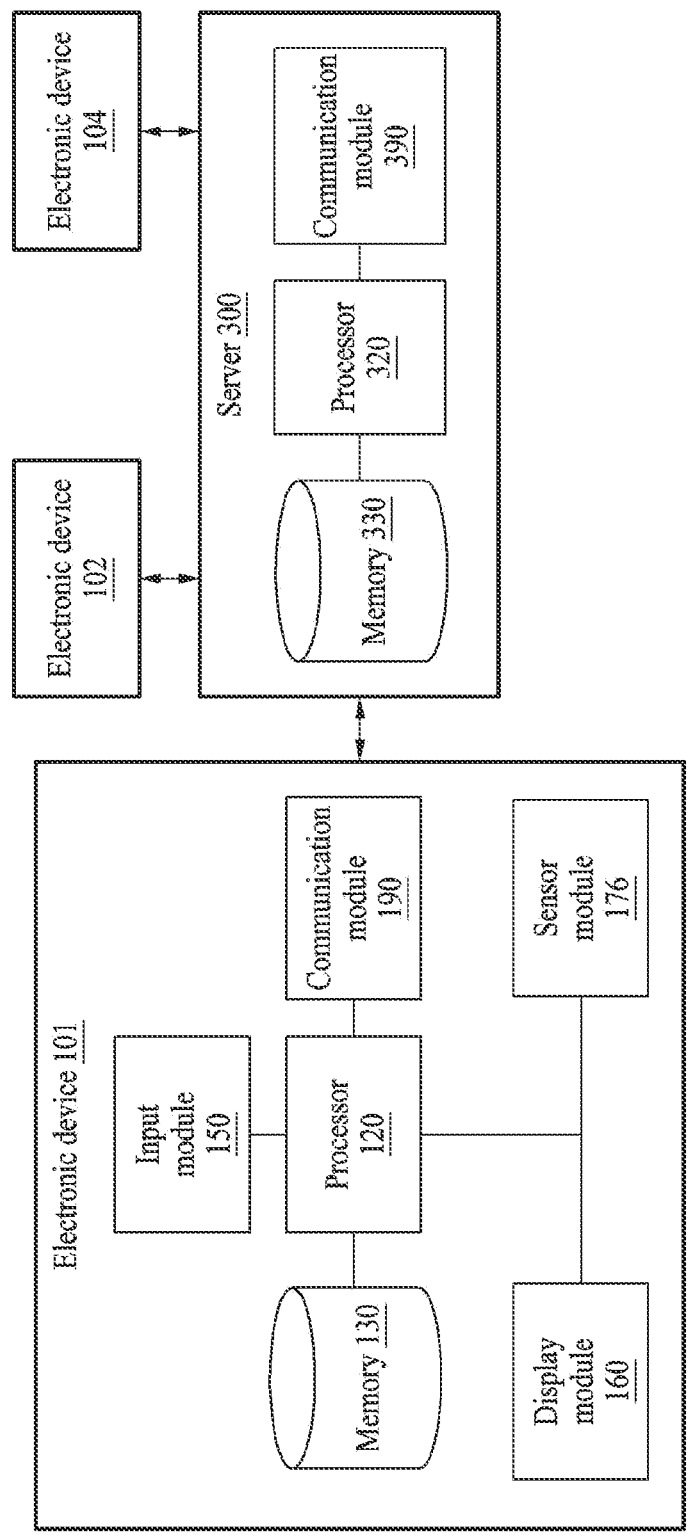
FIG. 3 is a block diagram illustrating a configuration of an electronic device and a configuration of a cloud server according to an embodiment.

FIG. 3 is a block diagram illustrating an example configuration of an electronic device (e.g., the electronic devices 101, 102, and 104) and a configuration of a cloud server 300 according to an embodiment.

Referring to FIG. 3, illustrated are a plurality of electronic devices 101, 102, and 104 and a cloud server 300 supporting a joint work between the electronic devices 101, 102, and 104.

The electronic device 101 may include the communication module 190 that communicates with the cloud server 300, the display module 160 that displays a screen based on output data received from the server 300, the memory 130 that stores therein computer-executable commands, and the processor 120 that executes the instructions by accessing the memory 130. The electronic device 101 may include the input module 150 that receives a user input and the sensor module 176 that obtains information associated with a touch input. For a more detailed description of the electronic device 101, the memory 130, the processor 120, the input module 150, the communication module 190, the display module 160, and the sensor module 176, reference may be made to what has been described above with reference to FIGS. 1 and 2 and a repeated description thereof will be omitted here.

According to an embodiment, the instructions stored in the memory 130 of the electronic device 101 may be configured to cause the electronic device 101 to generate coordinate information based on a user input; transmit input data including the coordinate information and time information corresponding to the coordinate information to the cloud server 300; and display an object corresponding to the coordinate information based on setting information included in output data received from the cloud server 300. The output data may include the coordinate information input to at least one (e.g., the electronic devices 101 and 102) of one or more electronic devices (e.g., the electronic devices 101, 102, and 104) and the setting information corresponding to the coordinate information.

The electronic device 102 and the electronic device 104 may include the same or corresponding components as the electronic device 101, and the electronic devices 101, 102, and 104 may perform a joint work through the cloud server 300. For example, any one of drawing and handwriting may be performed in each of the electronic devices 101, 102, and 104, and a result of the performing may be output from all the electronic devices 101, 102, and 104.

The cloud server 300 may include a communication module 390 that communicates with the electronic devices 101, 102, and 104, a memory 330 that stores therein computer-executable instructions, and a processor 320. The communication module 390, the memory 330, and the processor 320 may be the same or similar components, for example, the communication module 190, the memory 130, and the processor 120 described above with reference to FIG. 1. The memory 330 may include, for example, a volatile memory or a non-volatile memory.

According to an embodiment, the instructions stored in the memory 330 of the cloud server 300 may be configured to cause the cloud server 300 to receive, from at least one (e.g., the electronic device 102) of one or more electronic devices (e.g., the electronic devices 101, 102, and 104), input data including coordinate information and time information corresponding to the coordinate information; determine whether there are adjacent coordinates within a threshold distance by analyzing the coordinate information; when there are the adjacent coordinates, generate setting information corresponding to the coordinate information; and transmit output data including the coordinate information and the setting information to the one or more electronic devices 101, 102, and 104.

According to an embodiment, the processor 320 of the cloud server 300 may determine whether there are adjacent coordinates based on coordinate information received from the same electronic device 101, and generate the setting information including output speed information of an object corresponding to the coordinate information. An example of determining whether there are adjacent coordinates based on coordinate information received from the same electronic device (e.g., the electronic device 101) will be described in detail with reference to FIG. 4.

According to an embodiment, the processor 320 of the cloud server 300 may determine whether there are adjacent coordinates based on coordinate information received from different electronic devices (e.g., the electronic devices 101 and 102), and generate the setting information including output time information of an object corresponding to the coordinate information. An example of determining whether there are adjacent coordinates based on coordinate information received from different electronic devices (e.g., the electronic devices 101 and 102) will be described in detail with reference to FIG. 5. In addition, an example of determining whether there are adjacent coordinates based on the coordinate information received from the different electronic devices (e.g., the electronic devices 101 and 102), and displaying an object on the electronic devices 101, 102, and 104 will be described in detail with reference to FIGS. 7, and 8A through 8D.

According to an embodiment, the setting information corresponding to the coordinate information may be generated according to user settings. For example, when the coordinate information received from the same electronic device 101 indicates adjacent coordinates according to the user settings, the setting information may include the output time information instead of output speed information of the object. For another example, when the coordinate information received from different electronic devices, for example, the electronic devices 101 and 102, indicates adjacent coordinates, the setting information may include the output speed information instead of the output time information of the object. Alternatively, the setting information may not be generated according to the user settings.

According to an embodiment, the time information may not be included in the input data, and the processor 320 may transmit the coordinate information to the one or more electronic devices 101, 102, and 104 without generating the setting information corresponding to the coordinate information.

According to an embodiment, the coordinate information may be generated according to a user input to each of the one or more electronic devices 101, 102, and 104, and the user input may include, for example, any one of drawing and handwriting. Whether there are adjacent coordinates may be determined in various ways depending on a type of the user input. An operation of the processor 320 of the cloud server 300 to determine adjacent coordinates according to a type of a user input will be described in detail below with reference to FIG. 6.

According to an embodiment, the processor 320 of the cloud server 300 may use an algorithm for maintaining consistency between pieces of coordinate information received from the one or more electronic devices 101, 102, and 104. For example, the processor 320 may use an operational transformation (OT) algorithm to prevent a collision between pieces of coordinate information received from different electronic devices.

According to an embodiment, a processor (e.g., the processor 120 of the electronic device 101) of the one or more electronic devices 101, 102, and 104 may display an object corresponding to coordinate information, based on the coordinate information and setting information corresponding to the coordinate information received from the cloud server 300. For example, objects may be displayed on the electronic device 101 as to be described below with reference to FIGS. 4 through 8D. Although examples will be described based mainly on the electronic device 101 with reference to FIGS. 4 through 8D, examples are not limited thereto and the same screen may also be displayed on each of the one or more electronic devices 101, 102, and 104.

Hereinafter, operations of the electronic device 101 and the cloud server 300 will be described in detail with reference to FIGS. 4 through 10.

Figure 4:
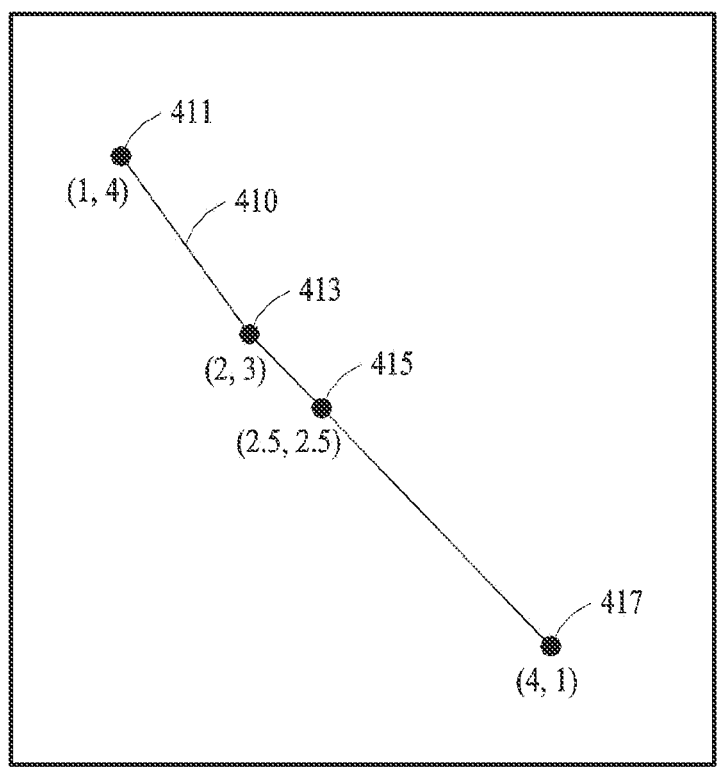
FIG. 4 is a diagram illustrating an example of correcting an output speed of an object corresponding to adjacent coordinates according to an embodiment.

FIG. 4 is a diagram illustrating an example of correcting an output speed of an object corresponding to adjacent coordinates according to an embodiment.

Although FIGS. 4 through 8D illustrate example screens displayed on the electronic device 101, this is provided merely as an example, and it should be understood the same screen may be displayed on each of one or more electronic devices (e.g., the electronic devices 101, 102, and 104) communicating with the cloud server 300.

According to an embodiment, for a joint work (e.g., interoperation) performed between the one or more electronic devices 101, 102, and 104 through the cloud server 300, the processor 320 of the cloud server 300 may determine whether adjacent coordinates are extant based on coordinate information received from the same electronic device 101. For example, a user may draw, with a digital pen, a line 410 including coordinates 411, 413, 415, and 417 on the electronic device 101. In this example described with reference to FIG. 4, the user may input, to the electronic device 101, the coordinates in sequential order, starting from the coordinate 411 to the coordinate 413, the coordinate 415, and the coordinate 417. The processor 120 of the electronic device 101 may receive the user input through the input module 150, and generate the coordinate information based on the user input.

According to an embodiment, the processor 120 of the electronic device 101 may transmit input data including the coordinate information and time information corresponding to the coordinate information to the cloud server 300. For example, the processor 120 of the electronic device 101 may transmit, as the input data, information (1, 4), (2, 3), (2.5, 2.5), and (4, 1) about the coordinates 411, 413, 415, and 417 and the time information about time at which the coordinates 411, 413, 415, and 417 are input, respectively.

According to an embodiment, the processor 320 of the cloud server 300 may determine whether there are adjacent coordinates disposed within a threshold distance of one another, by analyzing the coordinate information. For example, as illustrated in FIG. 4, a distance between the coordinate 413 and the coordinate 415 is less than or equal to the threshold distance (e.g., a unit of 1 distance), the processor 320 of the cloud server 300 may determine that adjacent coordinates are extant within the coordinate information.

According to an embodiment, when there are adjacent coordinates, the processor 320 of the cloud server 300 may generate setting information corresponding to the coordinate information, and transmit output data including the coordinate information and the setting information to the one or more electronic devices 101, 102, and 104. According to an embodiment, when determining that there are adjacent coordinates based on the coordinate information received from the same electronic device 101, the processor 320 may generate the setting information including output speed information of an object corresponding to the coordinate information.

For example, when the coordinates 413 and 415, as received from the same electronic device 101, are adjacent to each other, the processor 320 may set an output speed for the adjacent coordinates 413 and 415 to be a first speed, which may be comparatively low or slow. In contrast, the processor 320 may set an output speed to be a second speed, that is comparatively high or fast, being greater than the first speed, for the other coordinates 411 and 417 that are not adjacent to each other.

According to an embodiment, the one or more electronic devices 101, 102, and 104 may display the object corresponding to the coordinate information based on the setting information in the received output data. For example, referring to FIG. 4, after the coordinate 411 is displayed on the electronic device 101, the coordinate 413 and a line segment between the coordinates 411 and 413 may be output "fast" (e.g., at the second speed). Thereafter, the coordinate 415 and a line segment between the coordinates 413 and 415 may be output "slow" (e.g., at the first speed), and the coordinate 417 and a line segment between the coordinates 415 and 417 may be output fast again. Because the one or more electronic devices 101, 102, and 104 are performing a joint work together, the screen of the electronic device 101 is illustrated in FIG. 4. However, the same objects may be also displayed on the displays of the other electronic devices 102 and 104. An example of how an object is displayed according to setting information will be described in detail below with reference to FIGS. 8A through 8D.

According to the embodiment described above with reference to FIG. 4, the correction of an output speed may improve the visibility of the adjacent coordinates 413 and 415 and may allow joint users (e.g., respective users of the one or more electronic devices 101, 102, and 104) to identify a sequence of the work more clearly.

Figure 5:
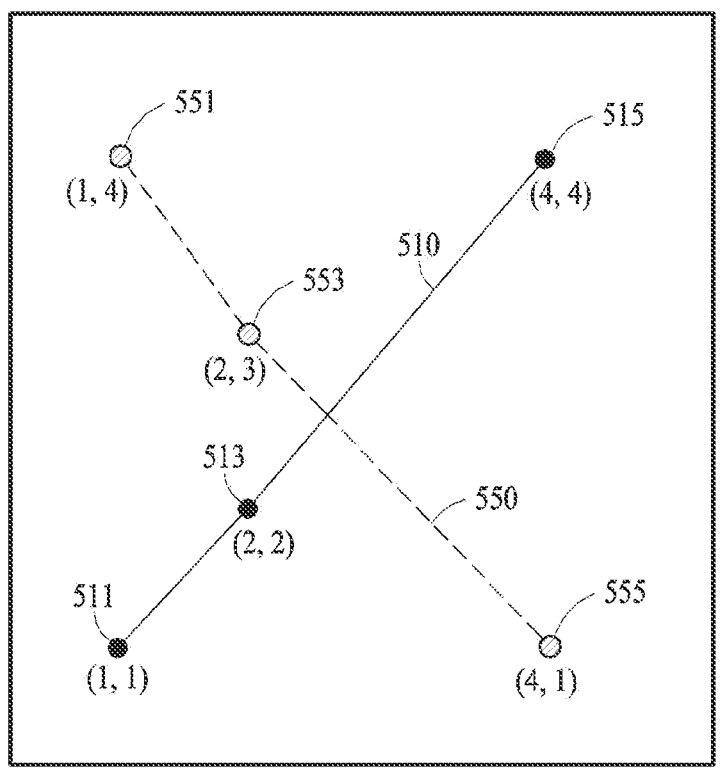
FIG. 5 is a diagram illustrating an example of correcting an output time through time-shifting for adjacent coordinates according to an embodiment.

FIG. 5 is a diagram illustrating an example of correcting an output time through time-shifting for adjacent coordinates according to an embodiment.

Referring to FIG. 5, illustrated is an example screen displayed on the electronic device 101 in which the one or more electronic devices 101, 102, and 104 perform a joint work through the cloud server 300. Although FIG. 5 illustrates a screen displayed on the electronic device 101 for convenience of description, a user of the electronic device 101 may perform a work with the electronic device 101 and a user of the electronic device 102 may perform a work with the electronic device 102, and objects in setting information generated by the cloud server 300 may be displayed on respective screens of all electronic devices (e.g., the one or more electronic devices 101, 102, and 104) performing the joint work.

For example, the user of the electronic device 101 may draw a line 510 including coordinates 511, 513, and 515 on the electronic device 101 with a digital pen, and the user of the electronic device 102 may draw a line 550 including coordinates 551, 553, and 555 with a digital pen. In this example described with reference to FIG. 5, the coordinates 511, 513, and 515 may be sequentially input to the electronic device 101, and the coordinates 551, 553, and 555 may be sequentially input to the electronic device 102. The processors of the electronic devices 101 and 102 may each receive the respective user inputs through input modules and generate the coordinate information based on the user inputs.

According to an embodiment, the processors of the electronic device 101 and 102 may each transmit input data including the coordinate information and time information corresponding to the coordinate information to the cloud server 300. For example, the processor 120 of the electronic device 101 may transmit, as the input data, the coordinates (1, 1), (2, 2), and (4, 4) as the coordinates 511, 513, and 515, and the time information which indicates times at which each of the coordinates 511, 513, and 515 are input respectively. In addition, the processor of the electronic device 102 may transmit, as the input data, coordinates (1, 4), (2, 3), and (4, 1) as the coordinates 551, 553, and 555, and the time information which indicates times at which each of the coordinates 551, 553, and 555 were input respectively.

According to an embodiment, the processor 320 of the cloud server 300 may analyze the coordinate information received from the electronic devices 101 and 102, which are different electronic devices, and may determine whether there are any adjacent coordinates within a threshold distance found within the coordinate information. For example, since a distance between the coordinate 553 input from the electronic device 102 and the coordinate 513 input from the electronic device 101 is less than or equal to the threshold distance (e.g., a distance unit of "1"), the processor 320 of the cloud server 300 may determine that there are adjacent coordinates extant in the coordinate information.

According to an embodiment, when determining that there are adjacent coordinates, the processor 320 of the cloud server 300 may generate setting information corresponding to the coordinate information, and transmit output data including the coordinate information and the setting information to the one or more electronic devices 101, 102, and 104. When determining that there are adjacent coordinates in the coordinate information received from the different electronic devices 101 and 102, the processor 320 may generate the setting information including output time information of an object corresponding to the coordinate information.

For example, the processor 320 may generate the setting information by correcting an output time via time-shifting for the adjacent coordinates 513 and 553. The processor 320 may perform time-shifting on the output time based on a coordinate (e.g., the coordinate 513) that is input first between the two adjacent coordinates 513 and 553. An example of how the processor 320 of the cloud server 300 generates setting information by performing time-shifting on adjacent coordinates input from different electronic devices will be described in detail below with reference to FIG. 7.

According to an embodiment, the one or more electronic devices 101, 102, and 104 may display the object corresponding to the coordinate information based on the setting information in the received output data. For example, referring to FIG. 5, after the coordinate 511 is displayed on the electronic device 101, the output of coordinates 513, 515, 551, 553, and 555 may be time-shifted. Although the screen of the electronic device 101 is illustrated in FIG. 5, objects may also be displayed in corresponding manner on the electronic device 102 and the electronic device 104, because the one or more electronic devices 101, 102, and 104 are performing an interoperative joint work together.

An example of how objects time-shifted based on setting information are output to each electronic device (e.g., the electronic devices 101, 102, and 104) will be described in detail below with reference to FIGS. 8A through 8D.

According to the embodiment described above with reference to FIG. 5, the correction of an output time through time-shifting may improve the visibility of the adjacent coordinates 513 and 553, and may allow joint users (e.g., the respective users of the one or more electronic devices 101, 102, and 104) to identify the sequence and subject of the work more clearly.

Figure 6:
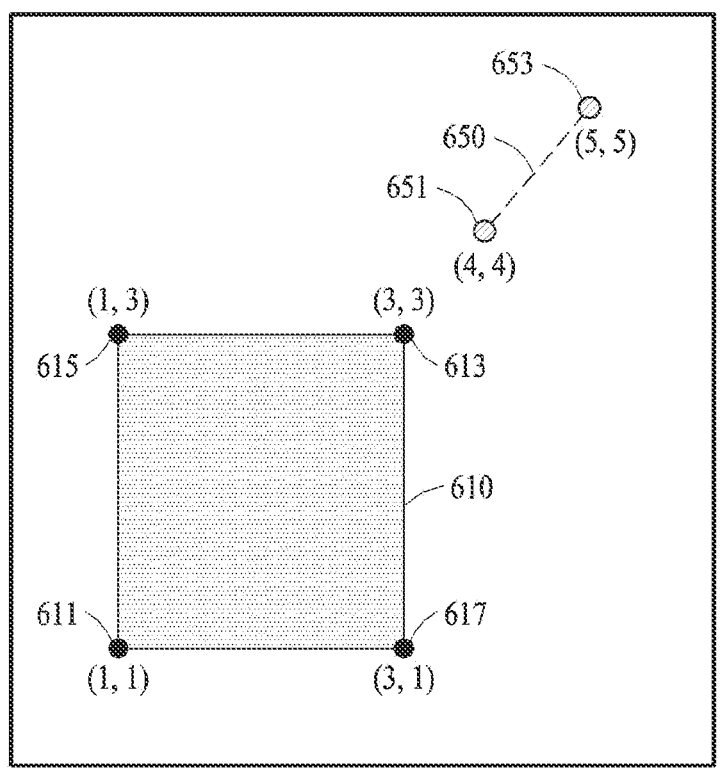
FIG. 6 is a diagram illustrating an operation of a cloud server to determine adjacent coordinates based on a type of a user input according to an embodiment.

FIG. 6 is a diagram illustrating an example operation of a cloud server to determine adjacent coordinates based on a type of a user input according to an embodiment.

Referring to FIG. 6, illustrated is an example screen displayed on the electronic device 101 when one or more electronic devices 101, 102, and 104 perform a joint work through the cloud server 300. Although examples of a user input have been described as coordinates and lines above with reference to FIGS. 4 and 5, the user input is not limited thereto, and various types of user inputs such as figures and characters may also be used during a joint work.

For example, referring to FIG. 6, a rectangular object 610 formed with coordinates 611, 613, 615, and 617 may be generated according to a user input to the electronic device 101, and a line 650 with coordinates 651 and 653 may be generated according to another user input to the electronic device 102.

As described above with reference to FIGS. 4 and 5, the processor 320 of the cloud server 300 may receive, from each client terminal (e.g., the electronic device 101 and the electronic device 102), input data including coordinate information based on a user input and time information, and may determine whether there are adjacent coordinates in the coordinate information.

Referring to FIG. 6, the processor 320 may calculate a shortest distance between the rectangular object 610 and the line 650. For example, the processor 320 may determine, as the shortest distance, a distance between the coordinate 613 of the rectangular object 610 and a coordinate (4, 4) 651 of the line 650. In this example, when the shortest distance is within a threshold distance, the processor 320 may determine the coordinate 613 and the coordinate 651 to be adjacent coordinates.

According to an embodiment, when adjacent coordinates are detected, the processor 320 may generate setting information corresponding to the coordinate information and transmit output data including the setting information and the coordinate information to the electronic devices 101, 102, and 104. As described above with reference to FIGS. 3 through 5, the setting information may include output speed information for an object corresponding to the coordinate information, or output time information corresponding to the coordinate information. The electronic devices 101, 102, and 104 may display the object corresponding to the coordinate information based on the setting information.

Figure 7:
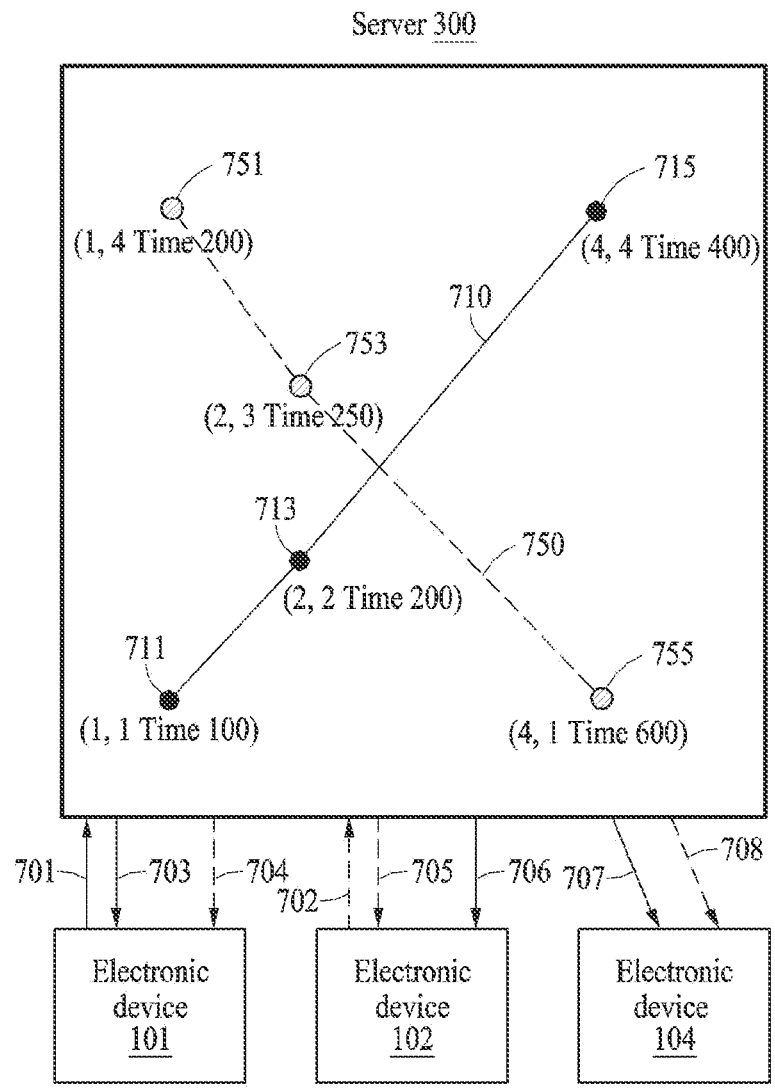
FIG. 7 is a diagram illustrating an operation of a cloud server to generate setting information for adjacent coordinates according to an embodiment.

FIG. 7 is a diagram illustrating an example operation of a cloud server to generate setting information for adjacent coordinates according to an embodiment.

Referring to FIG. 7, an example is illustrated of how one or more electronic devices 101, 102, and 104 perform a joint work through the cloud server 300. According to an embodiment, input data including coordinate information and time information may be transmitted to the cloud server 300 according to a user input to the electronic device 101 as indicated by an arrow 701, and may be transmitted to the cloud server 300 according to a user input to the electronic device 102 as indicated by an arrow 702.

The processor 320 of the cloud server 300 may obtain, from the input data received from the electronic device 101, information about a line 710 including coordinates 711, 713, and 715 and the time information about time at which the coordinates are input, and may obtain, from the input data received from the electronic device 102, information about a line 750 including coordinates 751, 753, and 755 and the time information about time at which the coordinates are input.

According to an embodiment, the processor 320 of the cloud server 300 may determine that there are adjacent coordinates because a distance between the coordinate 713 and the coordinate 753 is within a threshold distance (e.g., a distance unit of "1"), and generate setting information corresponding to the coordinate information.

For example, the processor 320 may generate the setting information, including output speed information, as associated with the coordinates 711, 713, and 715 that are included in the line 710, and which are input to the electronic device 101. For example, the processor 320 may delay an output time of the coordinate 713 to 300 by 100, and delay an output time of the coordinate 715 to 500 by 100, without changing an output time of the coordinate 711.

For another example, the processor 320 may time-shift an output time of the coordinates 751, 753, and 755 included in the line 750 input to the electronic device 102. For example, the processor 320 may shift the output time by 500 for each of all the coordinates 751, 753, and 755.

However, example embodiments are not limited to the above-described examples, and the processor 320 may generate the setting information in various ways. For example, the processor 320 may further change attribute values such as boldness, transparency, and color while correcting the output time or the output speed. For example, the processor 320 may apply boldness, increase transparency, increase thickness, and increase saturation for the coordinates 715, 753, and 755 that are input after the coordinate 713 which is input first between the adjacent coordinates 713 and 753, and may then exclude boldness, lower transparency, reduce thickness, and lower saturation for a corresponding coordinate or the coordinates 711 and 713 that are previously input.

According to an embodiment, the processor 320 of the cloud server 300 may transmit output data including the coordinate information and the setting information to the electronic devices 101, 102, and 104 that are performing the joint work together. For example, the output data corresponding to the work performed in the electronic device 101 may be transmitted to the electronic devices 101, 102, and 104 as indicated by arrows 703, 706, and 707, and the output data corresponding to the work performed in the electronic device 102 may be transmitted to the electronic devices 101, 102, and 104 as indicated by arrows 704, 705, and 708.

The electronic devices 101, 102, and 104 may display an object corresponding to the coordinate information based on the setting information in the received output data. An example of how objects are displayed on electronic devices will be described in detail below with reference to FIGS. 8A through 8D.

FIGS. 8A through 8D are diagrams illustrating an example of outputting a screen according to setting information in an electronic device according to an embodiment.

Referring to FIGS. 8A through 8D, after output data is transmitted to an electronic device as described above with reference to FIG. 7, an object corresponding to coordinate information may be displayed on the electronic device 101 according to setting information. Although the example to be described hereinafter with reference to FIGS. 8A through 8D is based mainly on the electronic device 101, example screens illustrated in FIGS. 8A through 8D may be displayed on all the electronic devices 101, 102, and 104 performing a joint work as described above with reference to FIG. 7.

For example, coordinates 811, 813, 815, 851, 853, and 855 and lines 810 and 850 that are illustrated in FIGS. 8A through 8D may correspond to the coordinates 711, 713, 715, 751, 753, and 755 and the lines 710 and 750 that are illustrated in FIG. 7. As described above with reference to FIG. 7, an output speed may be set to be a first speed (e.g., "slow") by being delayed by 100, starting from the coordinate 813 which is an adjacent coordinate among the line 810 and the coordinates 811, 813, and 815 corresponding to input data generated by the electronic device 101. In addition, as described above with reference to FIG. 7, an output time may be changed as the line 850 and the coordinates 851, 853, and 855 corresponding to input data generated by the electronic device 102 are all time-shifted by 500.

Figure 8A:
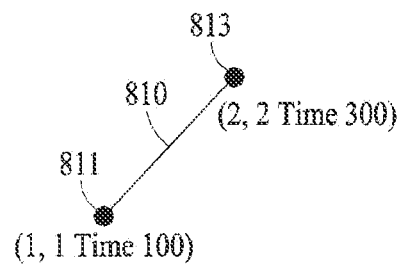
FIGS. 8A through 8D are diagrams illustrating an example of outputting a screen according to setting information in an electronic device according to an embodiment.
Figure 8B:
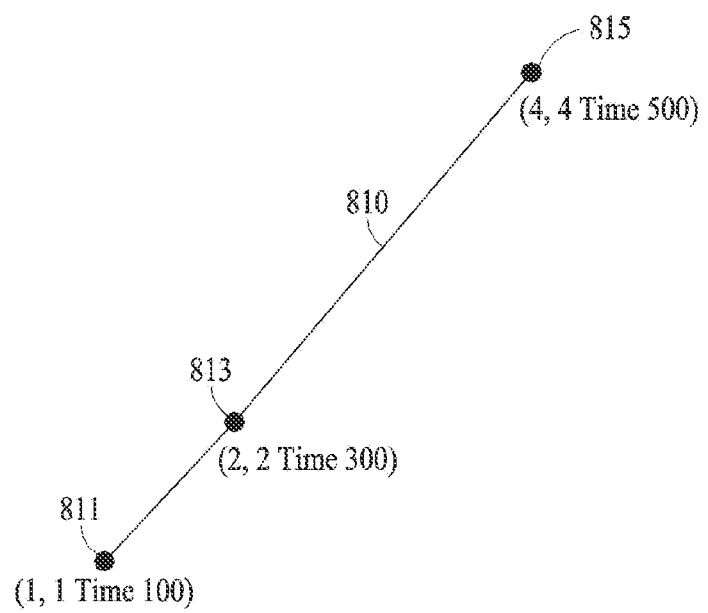

For example, referring to FIG. 8A, the coordinate 811 may be output at time 100 in the electronic device 101, and the coordinate 813 may be output at time 300, corresponding to a delay of 100 time units from time 200, that is the input time information described above with reference to FIG. 7. Referring to FIG. 8B, the coordinate 815 may be output at time 500 that is delayed by 100 time units from time 400 that is the input time information described above with reference to FIG. 7.

Figure 8C:
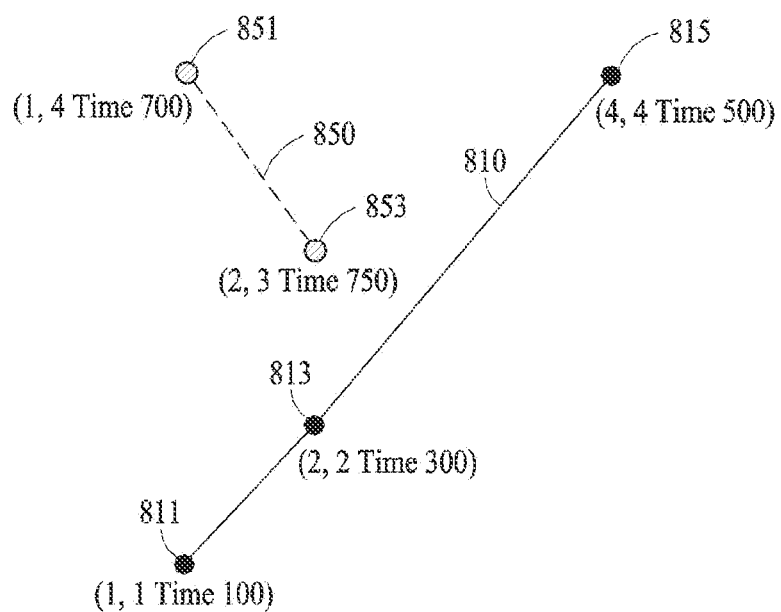
Figure 8D:
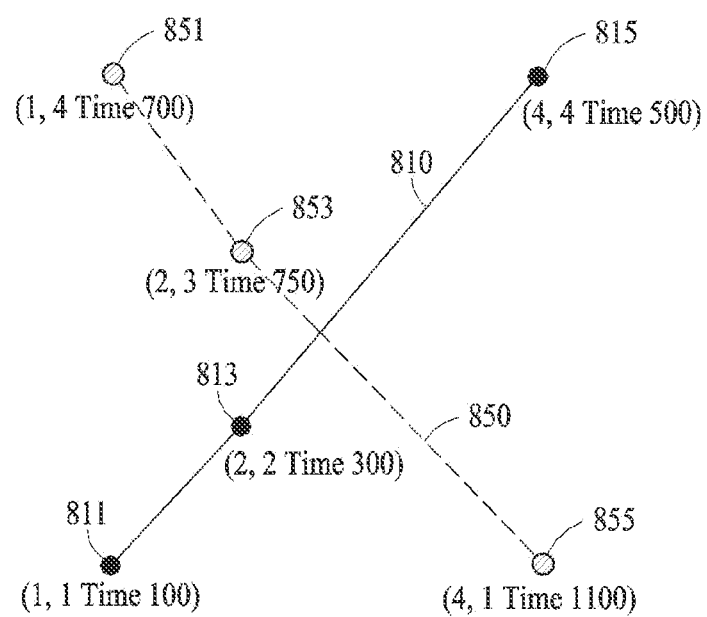

Referring to FIGS. 8C and 8D, the line 850 and the coordinates 851, 853, and 855 corresponding to the input data generated by the electronic device 102 may all be time-shifted by 500 to be output. The time information included in the input data of the coordinates 751, 753, and 755 described above with reference to FIG. 7 may include time 200, time 250, and time 600, respectively. However, referring to FIGS. 8C and 8D, they may be time-shifted by 500 each, and be output at time 700, time 750, and time 1100, respectively.

According to an embodiment, the time-shifting or the output speed correction for adjacent coordinates described above with reference to FIGS. 8A through 8D may be applied when synchronization is performed between coordinate information for respective users when joint users are performing work in real time.

According to embodiment, the time-shifting or the output speed correction described above with reference to FIGS. 8A through 8D may also be applied in the same way even when a user cancels (or rolls back) the execution. For example, in a situation of FIG. 8D, the user of the electronic device 101 may cancel the execution of an immediate portion of work performed by a joint user, and the example screens illustrated in FIGS. 8C, 8B, and 8A may be sequentially displayed on the electronic device 101.

While the screens illustrated in FIGS. 8C, 8B, and 8A, starting from the screen illustrated in FIG. 8D, are being displayed, the time-shifting or the output speed correction described above may be applied once again. For example, as the user of the electronic device 101 presses a button indicating "cancel execution" (or "undo," "roll back," etc.) in the situation of FIG. 8D, time at which the screen illustrated in FIG. 8C is output again may be time 1450 that is delayed from time 1100 of FIG. 8D by 350 that is a difference between time 750 of FIG. 8C and time 1100 of FIG. 8D. For another example, a time at which the screen illustrated in FIG. 8B is re-output after the execution is re-canceled in the situation of FIG. 8C, may be a time 1500 corresponding to a delay from time 1450 of FIG. 8C by 50 that is a difference between time 700 of FIG. 8B and time 750 of FIG. 8C.

According to an embodiment, as described above with reference to FIGS. 8A through 8D, an operation of displaying an object on the electronic device 101 may be activated or deactivated according to user settings. For example, when displaying a result of performing a joint work, the user of the electronic device 101 may configure a setting that controls adjustment of output based on the presence or absence of adjacent coordinates, while the user of the electronic device 102 and the user of the electronic device 104 may configure their own instances of the application to use the output adjustment function. In this example, the electronic device 101 may display an output based on the time information included in the input data generated by the electronic devices 101 and 102 as described above with reference to FIG. 7. For example, the coordinate 811 may be output at time 100, the coordinate 813 at time 200, the coordinate 815 at time 400, the coordinate 751 at time 200, the coordinate 753 at time 250, and the coordinate 755 at time 600.

<Operating Method of Electronic Device>

Figure 9:
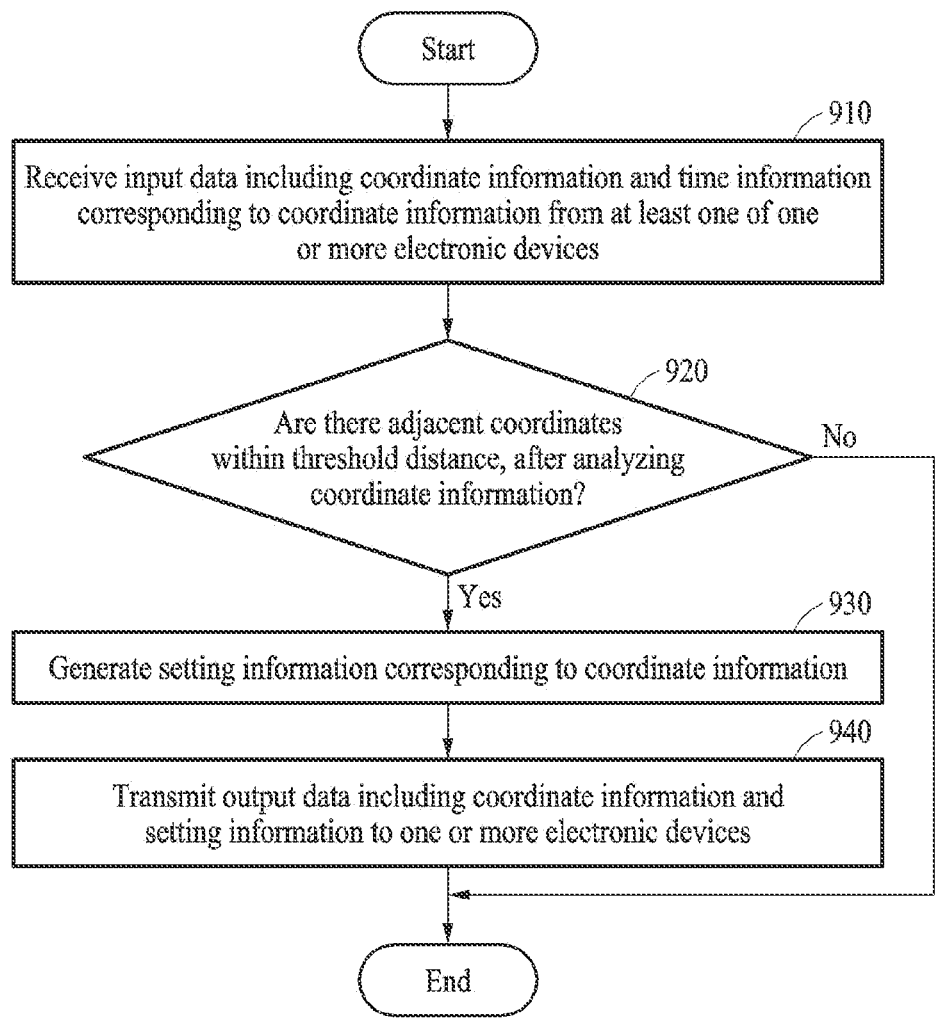
FIG. 9 is a flowchart illustrating an operating method of a cloud server according to an embodiment.

FIG. 9 is a flowchart illustrating an example operating method of a cloud server according to an embodiment.

Operations 910 through 940 to be described hereinafter with reference to FIG. 9 may be performed by the processor 320 of the cloud server 300 described above with reference to FIG. 3, and what has been described above with reference to FIGS. 1 through 8D will not be repeated for conciseness.

In operation 910, the processor 320 may receive input data including coordinate information and time information corresponding to the coordinate information from at least one device (e.g., the electronic device 101 and the electronic device 102) of one or more electronic devices (e.g., the electronic devices 101, 102, and 104).

In operation 920, the processor 320 may determine whether the coordinate information includes within it adjacent coordinates within a threshold distance of each other, by analyzing the coordinate information. In the absence of the adjacent coordinates, an object may be displayed on each electronic device without correction of the input data.

In operation 930, in the presence of the adjacent coordinates, the processor 320 may generate setting information corresponding to the coordinate information. As described above with reference to FIGS. 4 through 8D, the processor 320 may generate the setting information including output speed information of an object corresponding to the coordinate information or the setting information including output time information of the object corresponding to the coordinate information.

In operation 940, the processor 320 may transmit output data including the coordinate information and the setting information to the one or more electronic devices 101, 102, and 104.

Figure 10:
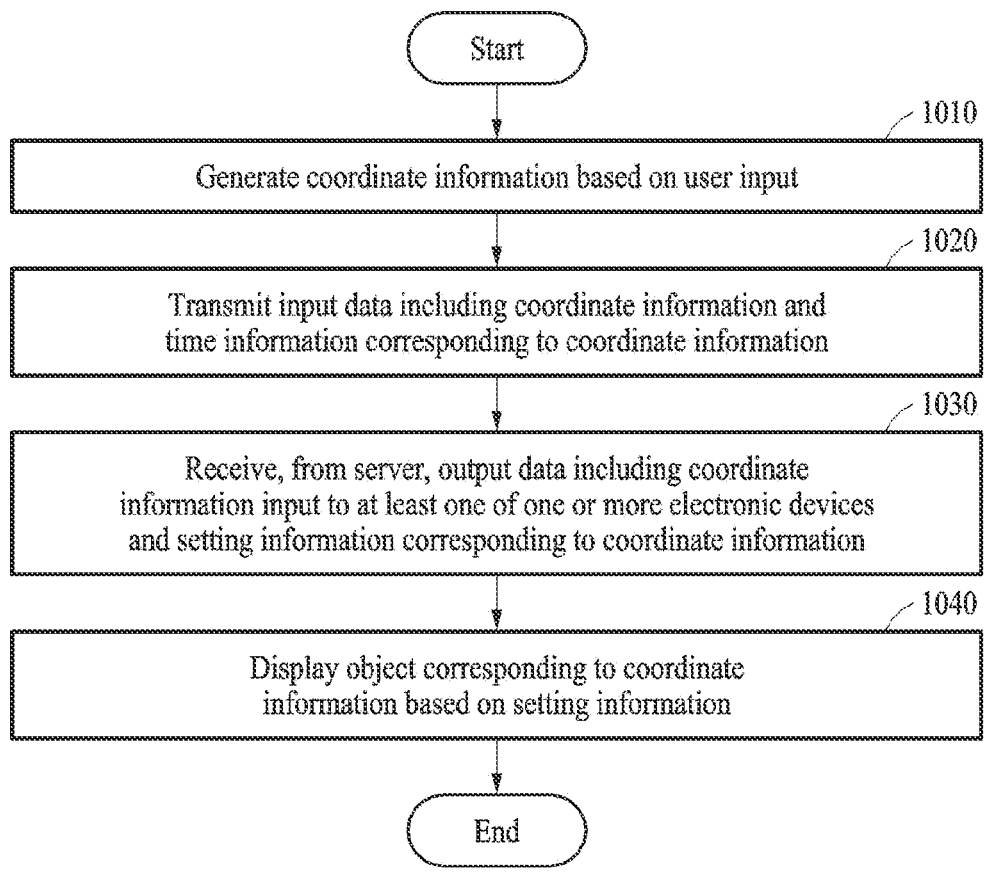
FIG. 10 is a flowchart illustrating an operating method of an electronic device according to an embodiment.

FIG. 10 is a flowchart illustrating an operating method of an electronic device according to an embodiment.

Operations 1010 through 1040 to be described hereinafter with reference to FIG. 10 may be performed by the processor 120 of the electronic device 101 described above with reference to FIG. 3, and what has been described above with reference to FIGS. 1 through 8D will not be repeated for conciseness.

In operation 1010, the processor 120 may generate coordinate information based on a user input. For example, as a user performs handwriting or drawing with the electronic device 101, the coordinate information may be generated.

In operation 1020, the processor 120 may transmit input data including the coordinate information and time information corresponding to the coordinate information to the cloud server 300. As described above with reference to FIGS. 4 through 8D, the processor 120 may transmit, to the cloud server 300, each coordinate and time information indicative of respective times at which each coordinate information is input. In addition, as described above with reference to FIG. 9, the processor 320 of the cloud server 300 may generate setting information corresponding to the coordinate information when there are adjacent coordinates based on the received input data.

In operation 1030, the processor 120 may receive output data from the cloud server 300. The output data may include coordinate information input to at least one (e.g., the electronic device 101 and the electronic device 102) of one or more electronic devices (e.g., the electronic devices 101, 102, and 104) and setting information corresponding to each coordinate information.

In operation 1040, the processor 120 may display an object corresponding to the coordinate information based on the setting information. As described above with reference to FIGS. 8A through 8D, the processor 120 may display the object according to the setting information in which an output time or an output speed is corrected.

According to an embodiment, a cloud server (e.g., the cloud server 300) for a joint work among one or more electronic devices (e.g., the electronic devices 101, 102, and 104) may include a communication module (e.g., the communication module 390) that communicates with the electronic devices 101, 102, and 104; a memory (e.g., the memory 330) that stores therein computer-executable instructions; and a processor (e.g., the processor 320) that executes the instructions by accessing the memory 330. The instructions may be configured to cause the cloud server 300 to receive input data including coordinate information and time information corresponding to the coordinate information from at least one (e.g., the electronic devices 101 and 102) of the electronic devices 101, 102, and 104; determine whether there are adjacent coordinates within a threshold distance by analyzing the coordinate information; when there are adjacent coordinates, generate setting information corresponding to the coordinate information; and transmit output data including the coordinate information and the setting information to the electronic devices 101, 102, and 104.

The coordinate information may be generated based on a user input to each of the electronic devices 101, 102, and 104, and the user input may include one of drawing and handwriting.

The adjacent coordinates may be determined based on coordinate information received from the same electronic device (e.g., the electronic device 101), and the setting information may include output speed information of an object corresponding to the coordinate information.

The adjacent coordinates may be determined based on coordinate information received from different electronic devices (e.g., the electronic devices 101 and 102), and the setting information may include output time information of an object corresponding to the coordinate information.

The instructions may be configured to cause the cloud server 300 to transmit the coordinate information to the one or more electronic devices 101, 102, and 104 without generating the setting information, when the time information is not present in the input data.

The instructions may be further configured to cause the cloud server 300 to use an algorithm for maintaining consistency in the coordinate information received from the one or more electronic devices 101, 102, and 104.

The setting information may be settable by a user.

The one or more electronic devices 101, 102, and 104 may display the object corresponding to the coordinate information based on the setting information.

According to an embodiment, an electronic device (e.g., the electronic device 101) may include a communication module (e.g., the communication module 190) that communicates with a server (e.g., the cloud server 300) for a joint work among one or more electronic devices (e.g., electronic devices 101, 102, and 104); a display module (e.g., the display module 160) that displays a screen based on output data received from the server 300; a memory (e.g., the memory 130) that stores therein computer-executable instructions; and a processor (e.g., the processor 120) that executes the instructions by accessing the memory 130. The output data may include coordinate information input to at least one (e.g., the electronic devices 101 and 102) of the one or more electronic devices 101, 102, and 104, and setting information corresponding to the coordinate information. The instructions may be configured to cause the electronic device 101 to generate the coordinate information based on a user input; transmit the input data including the coordinate information and time information corresponding to the coordinate information to the server 300; and display an object corresponding to the coordinate information based on the setting information.

The user input may include one of drawing and handwriting.

The server 300 may receive the input data including the coordinate information and the time information corresponding to the coordinate information from the at least one electronic device (e.g., the electronic devices 101 and 102) of the one or more electronic devices 101, 102, and 104; determine whether there are adjacent coordinates within a threshold distance by analyzing the coordinate information; when there are adjacent coordinates, generate the setting information corresponding to the coordinate information; and transmit the output data including the coordinate information and the setting information to the one or more electronic devices 101, 102, and 104.

The adjacent coordinates may be determined based on coordinate information received from the same electronic device (e.g., the electronic device 101), and the setting information may include output speed information of an object corresponding to the coordinate information.

The adjacent coordinates may be determined based on coordinate information received from different electronic devices, and the setting information may include output time information of an object corresponding to the coordinate information.

When the time information is not present in the input data, the server 300 may transmit the coordinate information to the one or more electronic devices 101, 102, and 104 without generating the setting information.

According to an embodiment, an operating method of the server 300 for a joint work among one or more electronic devices (e.g., the electronic devices 101, 102, and 104) may include: receiving input data including coordinate information and time information corresponding to the coordinate information from at least one (e.g., the electronic devices 101 and 102) of the one or more electronic devices 101, 102, and 104; determining whether there are adjacent coordinates within a threshold distance by analyzing the coordinate information; when there are adjacent coordinates, generating setting information corresponding to the coordinate information; and transmitting output data including the coordinate information and the setting information to one or more electronic devices 101, 102, and 104.

The coordinate information may be generated based on a user input to each of the one or more electronic devices 101, 102, and 104, and the user input may include one of drawing and handwriting.

The adjacent coordinates may be determined based on coordinate information received from the same electronic device (e.g., the electronic device 101), and the setting information may include output speed information of an object corresponding to the coordinate information.

The adjacent coordinates may be determined based on coordinate information received from different electronic devices (e.g., the electronic devices 101 and 102), and the setting information may include output time information of an object corresponding to the coordinate information.

The one or more electronic devices 101, 102, and 104 may display the object corresponding to the coordinate information based on the setting information While the present disclosure has been shown and described with reference to certain embodiments thereof, it will be understood by those skilled in the art that various changes in form and details may be made therein without departing from the present disclosure as defined by the appended claims and their equivalents.

What is claimed is:

1. A server providing cloud-based services for one or more electronic devices, comprising:
   a communication module configured to communicate with the one or more electronic devices;
   a memory storing computer-executable instructions; and
   a processor operatively coupled to the communication module and the memory,
   wherein the instructions are executable by the processor to cause the server to:
   receive input data including at least coordinate information; from at least one of the one or more electronic devices;
   determine whether adjacent coordinates are included in the coordinate information within a threshold distance of one another by analyzing the coordinate information;
   based on detecting the adjacent coordinates, generate setting information corresponding to the coordinate information; and
   transmit output data including the coordinate information and the setting information to the one or more electronic devices.

2. The server of claim 1, wherein the coordinate information is generated based on user inputs received by each of the one or more electronic devices,
   wherein the user inputs include any one of a drawing input and a handwriting input.

3. The server of claim 1, wherein the adjacent coordinates are determined based on coordinate information received from the same electronic device, and
   wherein the setting information includes output speed information for an object corresponding to the coordinate information.

4. The server of claim 1, wherein the adjacent coordinates are determined based on coordinate information received from different electronic devices, and
   wherein the setting information includes output time information for an object corresponding to the coordinate information.

5. The server of claim 1, wherein the instructions are further executable to cause the server to:
   when time information is omitted from the input data, transmit the coordinate information to the one or more electronic devices in absence of generating the setting information.

6. The server of claim 1, wherein the instructions are further executable to cause the server to:
   using an algorithm, maintain consistency between different pieces of coordinate information received from the one or more electronic devices.

7. The server of claim 1, wherein the setting information is configurable by a user.

8. The server of claim 1, wherein the one or more electronic devices are configured to display an object corresponding to the coordinate information based on the setting information.

9. An operating method of a server providing cloud-based services for one or more electronic devices, comprising:
   receiving input data including at least coordinate information from at least one of the one or more electronic devices;
   determining whether adjacent coordinates are included in the coordinate information within a threshold distance by analyzing the coordinate information;
   based on detecting the adjacent coordinates, generating setting information corresponding to the coordinate information; and
   transmitting output data including the coordinate information and the setting information to the one or more electronic devices.

10. The operating method of claim 9, wherein the coordinate information is generated based on user inputs received by each of the one or more electronic devices,
    wherein the user inputs include any one of a drawing input and a handwriting input.

11. The operating method of claim 9, wherein the adjacent coordinates received from the same electronic device, and wherein the setting information includes output speed information for an object corresponding to the coordinate information.

12. The operating method of claim 9, wherein the adjacent coordinates are determined based on coordinate information received from different electronic devices, and wherein the setting information includes output time information for an object corresponding to the coordinate information.

13. The operating method of claim 9, wherein the one or more electronic devices are configured to display an object corresponding to the coordinate information based on the setting information.

14. A non-transitory computer-readable storage medium storing instructions that, when executed by a processor, cause the processor to perform the operating method of claim 9.

* * * * *